United States Patent [19]

Johnson

[11] 3,999,299
[45] Dec. 28, 1976

[54] EDGE FINDER

[76] Inventor: Elmer E. Johnson, 622 Locust Road, Sausalito, Calif. 94965

[22] Filed: Mar. 24, 1975

[21] Appl. No.: 561,273

[52] U.S. Cl. .................. 33/169 C; 33/172 D; 33/185 R

[51] Int. Cl.² ........................... G01B 5/25

[58] Field of Search .......... 33/169 C, 172 D, 185 R

[56] References Cited

UNITED STATES PATENTS

| | | | |
|---|---|---|---|
| 1,252,777 | 1/1918 | Casler | 33/169 C |
| 2,451,904 | 10/1948 | Beatty | 33/169 C |
| 2,860,418 | 11/1958 | Johnson | 33/172 D |
| 3,370,356 | 2/1968 | Jend | 33/169 C |

*Primary Examiner*—William D. Martin, Jr.
*Attorney, Agent, or Firm*—Gordon Wood

[57] ABSTRACT

An edge finder adapted to be secured to the chuck of a tool such as a drill press, vertical mill, jig bore and the like, to permit the user to align the center line of the rotating tool with an edge of a work piece. A housing is provided which is adapted to be secured within the chuck or like securing means on the rotatable spindle of the tool. A slide is provided in sliding abutment with an end of the housing and is yieldably held against the end of the housing by means of a spring thereby permitting lateral movement of the slide relative to the housing end. A finger adapted to engage an edge of the work piece is rotatably supported at one end in the slide and is shaped at its other end so as to permit the user to obtain an accurate alignment of the center line of the tool and the edge of the work piece.

3 Claims, 3 Drawing Figures

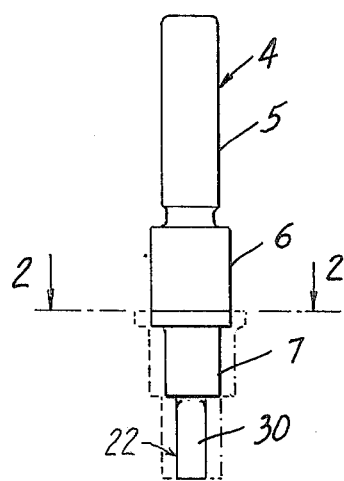
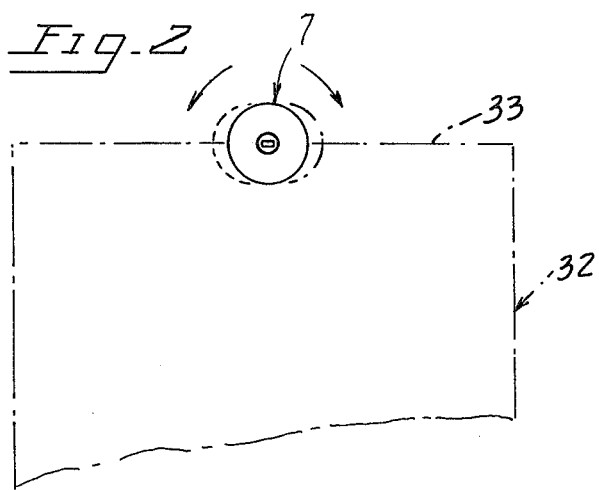
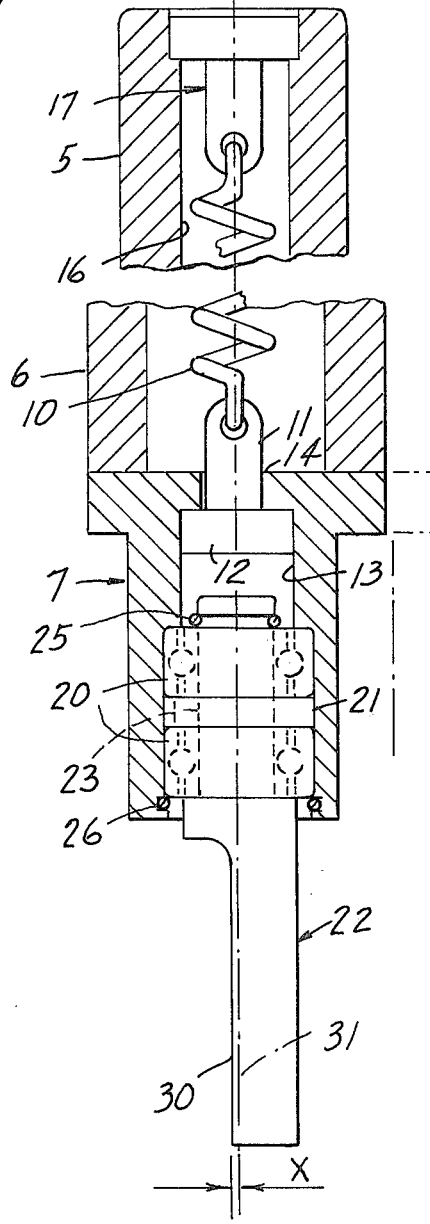

EDGE FINDER

This invention relates to an edge finder for accurately locating the central axis of a rotating tool in relation to the edge of a work piece.

Heretofore, edge finders have been provided by which an operator can bring an edge of a work piece against the rotating edge finder in such a way that the center line of a tool is a predetermined distance from the edge of the work piece. The disadvantage of such prior art devices is that the radius of the portion of the edge finder that "feels" the edge of the work piece must be added to the dimension representing the distance from the edge at which the tool is to operate. This requirement tends to cause errors.

Other devices have been proposed to obtain an exact alignment of the center line of a tool and the edge of the work piece; see, for example, U.S. Pat. No. 2,649,783. However, such devices have been quite complicated and difficult to use.

The main object of the present invention is the provision of an extremely accurate edge finder by the use of which an operator may accurately align the center line of a tool with the edge of a work piece.

Another object of the invention is the provision of a relatively easily and inexpensively constructed edge finder which is adapted to provide an accurate alignment between the center line of the tool and the edge of the work piece.

Other objects and advantages of the present invention will be apparent from the following specification and the drawings.

FIG. 1 is a side elevation of the edge finder of the invention showing schematically in dotted lines and in dot-dash lines the movement of the slide depending on the direction of rotation of the tool.

FIG. 2 is a horizontal transverse section through the edge finder as taken in a plane indicated by lines 2—2 of FIG. 1. A work piece is indicated in FIG. 2 in dot-dash lines.

FIG. 3 is a greatly enlarged fragmentary vertical sectional view of the edge finder.

Referring to FIG. 1, the edge finder 4 comprises an upper elongated hollow cylindrical portion 5 which is adapted to be secured within a chuck or other securing means on a rotating tool such as a drill press or the like (not shown). Integral with the upper portion 5 is a lower hollow cylindrical portion 6 which is preferably larger in diameter than the upper portion 5.

Abutting the lower side of the lower portion 6 is a slide 7 which is preferably equal in diameter at its upper end to the lower end of portion 6 and is reduced in diameter downwardly from its upper end. This slide 7 abuts the lower end of portion 6 and is resiliently urged against said lower end by means of a tension spring 10 (FIG. 3). This spring 10 is secured at its lower end to an apertured lug 11 formed on a disk 12 which in turn is received within a vertically extending bore 13 in slide 7. The upper end of slide 7 is apertured as at 14 to receive the ear 11 therethrough.

The spring 10 extends upwardly through a central bore 16 in the upper portion 5 of the edge finder and is secured at its upper end to an anchor 17 which is similar in construction to the lower disk 12 and lug 11.

At this point it will be apparent that lateral sliding movement of the slide 7 is possible relative to the portion 6 of the edge finder.

The bore 13 in slide 7 is enlarged in diameter at the lower end of the latter to receive therein a pair of similar roller bearings 20 spaced apart by means of an annular spacer 21. Rotatably supported in said bearings 20 is an elongated work engaging finger 22 formed with a cylindrical portion 23 at its upper end to tightly engage the inner races of bearings 20. A retainer 25 is provided adjacent the upper end of finger 22 to secure the finger axially relative to the inner races of bearing 20. The lower side of the lower bearing 20 may be held in place relative to the slide 7 by means of lower retainer 26.

As best seen in FIG. 3, the finger 22 is formed at its lower end with a flat 30 which is spaced slightly outwardly from the central axis 31 of the edge finder. This central axis of the edge finder is of course coincident with the central axis of the rotating tool.

The spacing between the central axis 31 and the flat 30 is indicated at X in FIG. 3 and for the particular device shown in FIG. 1 may be in the order of a few thousandths of an inch. The function of the spacing X will now be described.

In operation, a work piece such as that indicated at 32 in dot-dash lines in FIG. 2, and having an edge 33 from which an operation such as drilling is to be performed at a predetermined distance is moved on the work holding table (not shown) in a manner well known in the art, toward the flat 30 of the finger 22. Assuming that the tool is rotating in a clockwise direction as shown in FIG. 2, the work piece 32 is brought into engagement with the flat 30 thereby tending to urge the finger 22 in the same direction of movement as the work piece. Because of bearings 20 the finger 22 does not rotate with slide 7. However, because of the sliding connection between the slide 7 and the upper portion of the edge finder, the slide 7 actually moves at right angles to the direction of travel of the work piece to a position which is indicated by dot-dash lines in FIG. 2, assuming clockwise rotation in FIG. 2. If the spacing X is in the order of a few thousandths of an inch, the movement of the slide 7 may be in the order of a 32nd of an inch and therefore clearly visible to the operator. Upon such movement being noticed, further movement of the work piece toward the flat 30 is discontinued and the edge 33 is in exact alignment with the central axis of the tool. If the rotation of the tool is counterclockwise, the slide 7 moves to the left to the dotted line position.

The exact dimension X will vary depending on the mass and speed of the various parts of the edge finder and may be accurately determined empirically for one particular size of edge finder.

I claim:

1. An edge finder for aligning the center line of a rotating tool with an edge of a work piece, comprising:
    an elongated housing adapted to be secured at one of its ends to a spindle of such tool to permit said housing to be rotated about the center line of such tool,
    a slide in sliding abutment with the other end of said housing,
    means yieldably urging said slide toward said other end,
    an antifriction bearing in said slide,
    a work engaging elongated finger rotatably supported at one end in said bearing and adapted to engage an edge of the work piece.

2. An edge finder according to claim 1 wherein said finger is formed with a flat for engaging said edge.

3. An edge finder according to claim 2 wherein said flat is in a plane parallel to the axis of rotation of said finger and slightly offset therefrom.

* * * * *